US012806877B2

(12) United States Patent
Haslbeck et al.

(10) Patent No.: US 12,806,877 B2
(45) Date of Patent: Nov. 24, 2026

(54) METHOD FOR OPERATING A PRESS, COMPUTER PROGRAM AND ELECTRONICALLY READABLE DATA CARRIER

(71) Applicant: Bayerische Motoren Werke Aktiengesellschaft, Munich (DE)

(72) Inventors: Lisa Haslbeck, Aham (DE); Ingo Heinle, Inzell (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 298 days.

(21) Appl. No.: 18/683,980

(22) PCT Filed: Aug. 25, 2022

(86) PCT No.: PCT/EP2022/073681
§ 371 (c)(1),
(2) Date: Feb. 15, 2024

(87) PCT Pub. No.: WO2023/041301
PCT Pub. Date: Mar. 23, 2023

(65) Prior Publication Data

US 2024/0351300 A1 Oct. 24, 2024

(30) Foreign Application Priority Data

Sep. 17, 2021 (DE) ..................... 10 2021 124 051.4

(51) Int. Cl.
*B30B 15/26* (2006.01)
*B30B 9/28* (2006.01)

(52) U.S. Cl.
CPC ................ *B30B 15/26* (2013.01); *B30B 9/28* (2013.01)

(58) Field of Classification Search
CPC ........... B30B 15/26; B30B 9/28; B21D 22/20; G05B 19/41875; G05B 2219/37398;
(Continued)

(56) References Cited

U.S. PATENT DOCUMENTS 5,450,347 A 9/1995 Thoms et al.
7,257,460 B2 * 8/2007 Venugopal ............. B30B 15/26
700/146
(Continued)

FOREIGN PATENT DOCUMENTS

DE 30 28 834 C2 7/1989
DE 42 29 155 A1 3/1994
(Continued)

OTHER PUBLICATIONS

International Search Report (PCT/ISA/210) issued in PCT Application No. PCT/EP2022/073681 dated Dec. 5, 2022, with English translation (4 pages).
(Continued)

*Primary Examiner* — Christopher E. Everett
(74) *Attorney, Agent, or Firm* — Crowell & Moring LLP

(57) ABSTRACT

A method for operating a press, wherein a relationship between a detected component property (current value) of the final product (e.g. surface quality), the provided material property of the semi-finished product (e.g. sheet thickness), and the detected production parameter (e.g. pressing pressure) is determined, for example, by a self-learning algorithm, on the basis of precedingly determined differential values between target and current values of the component property. The algorithm is subsequently used for targeted selection of samples for quality monitoring.

12 Claims, 1 Drawing Sheet

(58) Field of Classification Search
CPC ........... G05B 2219/45143; G05B 2219/50057; G05B 19/401
See application file for complete search history.

(56) References Cited

U.S. PATENT DOCUMENTS

| | | | | |
|---|---|---|---|---|
| 2007/0193012 | A1* | 8/2007 | Bergman | G05B 19/401 29/407.04 |
| 2007/0240470 | A1* | 10/2007 | Suzuki | B21D 24/10 72/16.1 |
| 2008/0092620 | A1* | 4/2008 | Suzuki | B21D 24/10 72/362 |
| 2013/0231770 | A1* | 9/2013 | Cole | B21D 22/02 700/159 |
| 2016/0263699 | A1 | 9/2016 | Meichsner | |
| 2019/0265686 | A1 | 8/2019 | Obata et al. | |
| 2021/0394247 | A1* | 12/2021 | Schultz | G05B 19/40938 |

FOREIGN PATENT DOCUMENTS

| | | |
|---|---|---|
| DE | 10 2008 045 300 A1 | 3/2010 |
| DE | 10 2013 222 242 A1 | 4/2015 |
| DE | 10 2015 221 417 A1 | 5/2017 |

OTHER PUBLICATIONS

German-language Written Opinion (PCT/ISA/237) issued in PCT Application No. PCT/EP2022/073681 dated Dec. 13, 2022. with English translation (12 pages).
German-language Search Report issued in German Application No. 10 2021 124 051.4 dated Jan. 5, 2022, with partial English translation (12 pages).

* cited by examiner

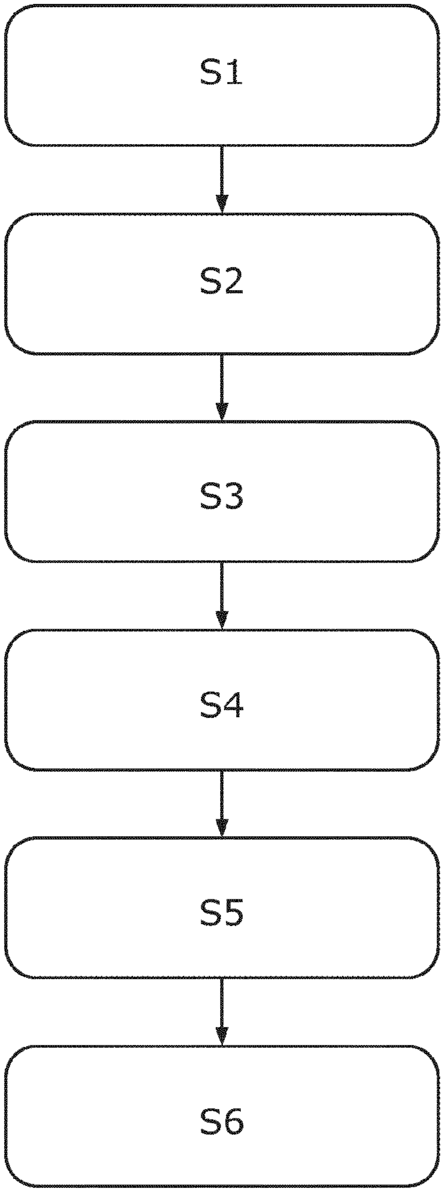
S1
S2
S3
S4
S5
S6

METHOD FOR OPERATING A PRESS, COMPUTER PROGRAM AND ELECTRONICALLY READABLE DATA CARRIER

BACKGROUND AND SUMMARY

The invention relates to a method for operating a press as disclosed herein. Furthermore, the invention relates to a computer program as disclosed herein. Finally, the invention relates to an electronically readable data carrier as disclosed herein.

Presses, such as forming presses and/or stamping presses, are often used in motor vehicle production. A component can be shaped from a semifinished product by a press, for example, in particular by forming. The semifinished product is advantageously formed for this purpose as a sheet or plate. The component can be a body component of a motor vehicle.

In general, data collection is entering the foreground more and more presently in order to be able to positively influence a component quality of the components formed by the press, for example. The data describe, for example, production parameters for the forming.

DE 10 2015 221 417 A1 shows how an individual identifier of isolated material parts can be provided linked with at least one part parameter defined in each case.

An object of the present invention is to provide a method for operating a press, a computer program, and a data carrier, with which at least one component property, in particular the component quality, of selected components can be detected in an advantageous manner and deviations from a target value can thus be detected and therefore avoided.

This object is achieved according to the invention by the subjects of the present disclosure. Advantageous embodiments and refinements of the invention are also specified in the description and the drawing.

A first aspect of the invention relates to a method for operating a press, in which semifinished products are shaped into components, in particular formed. The press is designed, for example, as a forming press and is advantageously used in motor vehicle production so that the components formed from the semifinished products form, for example, body components for motor vehicles.

The method according to the invention comprises several steps:

In a first step, at least one material property of the respective semifinished product, which is or is to be shaped in the press to form the respective component, is provided or made available. The material property can also be, for example, a material parameter. The material property describes a property of the semifinished product. If the semifinished product is designed, for example, as a sheet metal plate, the material property can describe a sheet thickness. Further examples of the at least one material property are a surface roughness, a lubricant quantity, a strength parameter, a tensile strength, etc. Providing the material property can be understood to mean that items of information, in particular a data set, are made available, for example, in which the respective material properties of the respective semifinished product are stored.

In a second step of the method, at least one production parameter is detected, which characterizes a status of the press during the shaping of the respective semifinished product to form the respective component. The production parameter therefore determines an operating status of the press during the shaping of the component. The production parameter can be designated as a process parameter. The production parameter can comprise, for example, a press pressure, a tool temperature of a tool of the press, a process temperature, a process duration, etc.

In a third step of the method, at least one of the shaped components is selected from a set of the formed components on the basis of the at least one material property of the semifinished product underlying the selected component and/or on the basis of the at least one production parameter, which is used during the shaping of the at least one selected component and is therefore detected, by an electronic computing device. In other words, the electronic computing device selects one component from multiple components which are shaped, for example, in their entirety for a production order or during a production process, in which, for example, a specific predetermined piece count of semifinished products is to be formed into the same amount of components. The selection can take place here on the basis of the at least one material property of the semifinished product, which is made available in particular in the electronic computing device and/or a storage device, and which is already known or which is detected by a suitable sensor device as a further step in the method before being made available, and/or on the basis of the production parameter. At least one component is therefore selected by the method according to the invention which can supply a special added value for a continuation of the method. In the third step, a sample is therefore selected for detecting at least one component property from the set of the produced or shaped components.

Therefore, in a fourth step of the method, at least one component property of the selected component is detected by a measuring device. The measuring device can be part of the press, but can also be a component independent of the press and can have, for example, at least one sensor for detecting the component property. The detected or measured component property in particular describes a component quality of the selected component here, so that a quality or a grade of the shaping of the component by the press is detectable or is detected by the detection of the component property.

In a fifth step of the method, a difference value is ascertained, which describes a deviation of the detected component property of the at least one selected component from a target value predetermined for a component type of the component. In other words, it is defined which properties the shaped component is to have, which is predetermined by the target value for the type of the component. The requirements for the component type therefore correspond to the requirements for an average component produced or formed by the press. A quality or grade of the components shaped by the press and therefore the quality and grade of the shaping process of the press can therefore be inferred particularly advantageously by way of the difference value.

Finally, in a sixth step of the method, the difference value is provided or made available. For example, the difference value can be retained in a nonvolatile and/or volatile memory area of the electronic computing device and/or the storage device.

In other words, in the method according to the invention for operating the press, an automated removal of samples, which is targeted in particular, in consideration, for example, of the quality of the semifinished products and the status of the production process is made possible. Items of information for the quality control and for the analysis of a process control of the press can be obtained by the detection of the component properties of the sample.

The invention is based on the finding here that there are possibilities for detecting the quality of semifinished products, for example, by sensors, and storing it in a central database. In addition, the storage of production parameters, for example, of plate cutting facilities, which manufacture the semifinished products from a coil, is known. Furthermore, methods exist in order to be able to assign these data uniquely to the respective semifinished products. Important boundary conditions in the production of components can thus be tracked or reconstructed on the basis of starting properties of the raw material—the semifinished products—over an entire process chain.

In addition, however, a detection of the quality of the produced components represents a challenge. Sensors do exist, for example, for a visual detection of the component geometry of all produced components, however, for example, reproducible mounting of the respective component in a measuring device is decisive for a particularly precise determination of the component geometry. The measurement of components based on such a measuring device is time-consuming and/or costly. Furthermore, a direct integration into the production process is difficult depending on the measuring device. Therefore, not all produced components are measured, but only a specific sample-type selection.

It therefore also appears reasonable for the future to continue a sample-type detection of component geometries or the component quality. Furthermore, in the case of the precise monitoring of individual samples, component properties, such as a surface quality, can also be detected for which industrially scalable solutions are not yet available. Thus, for example, there are industrial solutions for identifying cracks on surfaces, but further surface details can only be detected by sampling.

The detection of the quality of the produced components is particularly advantageous for an implementation of an advantageous process control or an advantageous operation of the press. The process control, thus the manner of operation of the press, causes requirements to be met for the component quality, for example, by appropriate adaptation of the production parameters or process parameters.

This adaptation can take place both automatically and semiautomatically. Semiautomatically is understood to mean that the process control proposes a change of the production parameters, but the change of the production parameters is performed by a facility operator.

Several advantages result by way of the method according to the invention. A base can thus be formed for the implementation of the process control without the presence of a continuous and therefore particularly complex detection of the component quality by skilled selection of samples—thus the selection of the at least one shaped component. A consideration of the component properties or quality features which are not detectable at an industrial scale is therefore advantageously possible by way of the method for shaping by the press. Furthermore, due to the targeted taking of samples, a particularly advantageous identification of relationships between semifinished product properties—thus of the at least one material property of the respective semifinished product—production parameters or process parameters, and the component property and therefore the component quality is possible.

In one advantageous embodiment of the invention, the at least one component is selected on the basis of the material properties if it or its value has a predetermined distance from an expected value of the material property. In other words, the semifinished product has at least one defined target property, which is generally predetermined by a specification. This specification can determine within which interval—the specification interval—deviations of the value of the material property can or are allowed to occur. The specification is thus agreed upon in general between a supplier of the semifinished products or the coils and the component shaper. Within this interval, there is a value or a smaller interval which corresponds to the expected value, this is in particular at or around the mean value of the material property. The expected value can be, for example, a predetermined sheet thickness, if the sheet thickness of the semifinished product now deviates from the predetermined sheet thickness, since the sheet thickness is greater or less than the predetermined sheet thickness, for example, the electronic computing device makes the decision to select the component formed from the thick or thin semifinished product for subsequent detection of the component property or the quality control as a sample. The distance which is to be present for a selection of the component is in particular a minimum distance here. Thus in particular material properties are of interest which do still correspond to the specification, but occur very rarely, that is to say they lie close to a specification limit away from the expected value. An anomaly or boundary condition of the forming process can thus be concluded particularly advantageously by way of the method.

In a further advantageous embodiment of the invention, the selection is performed by a self-learning algorithm and/or by at least one statistical method. In the self-learning algorithm, for example, a model is generated by methods of machine learning which is used as the basis for the selection and/or the selection is made by a neural network. Additionally or alternatively, the selection is performed by at least one statistical method. In other words, a self-learning algorithm is used for the selection which is capable, for example, on the basis of previously ascertained difference values, which have already been provided, of ascertaining the sample in a particularly advantageous manner in particular to ascertain a relationship between component property, the at least one material property, and/or at least one production parameter.

In a further advantageous embodiment of the invention, the selection of the component does not occur if the formed component to be selected is shaped during a starting process of the press. In other words, it is taken into consideration when the press is put into operation and/or when a pause of the operation of the press has taken place. Thus, for example, an operating temperature may not yet have been reached during the startup or after the pause and therefore a status, in particular a stationary status, in which the forming process is normally carried out, is not yet reached. If a component is selected in this phase, inferences between component property, the at least one material property, and/or at least one production parameter are made more difficult or are possibly even incorrect. It is therefore possible in a particularly advantageous manner that in particular in the case of mass production or production of many components under the same status of the press, unfavorable conditions are avoided in the detection of a component property by the measuring device.

In a further advantageous embodiment of the invention, the selection takes place in a stationary status of the press at least in the case of the at least one production parameter. In other words, the production parameter observed for the selection by the electronic computing device is a parameter which occurs in the stationary status, thus for example after the starting process. The press can thus be operated particularly advantageously.

In an advantageous embodiment of the invention, upon the selection of at least two components, the components are selected so that the at least one material property or a value of the material property of the first selected component differs from the at least one material property or a value of the material property of the at least one further selected component. The advantage thus results that anomalies or deviations of the component quality due to the material property of the semifinished products can be detected in a particularly advantageous manner. Anomalies, thus deviations from the target value which are not obviously comprehensible, can furthermore be detected particularly advantageously here if components are selected as the at least two components which have been shaped using the same process parameters or production parameters.

In a further advantageous embodiment of the invention, upon the selection of at least two components, at least one of the selected components is selected by a random method. The selection of at least one of the components therefore corresponds to the method for sample determination previously known in the prior art, for example, systematic errors can be avoided by this mixing. The components thus selected by the electronic computing device can be used particularly advantageously to ascertain deviations of the component property.

In a further advantageous embodiment of the invention, the at least one production parameter is set for subsequent shaping of a further component in dependence on the provided difference value. The at least one production parameter or its dimension, which has an influence on the component property, is therefore set for following shaping of a further component in dependence on the provided difference value. In other words, on the basis of the determination of the component property of the component selected as a sample, an inference is made possible about which components subsequently to be formed can be influenced particularly advantageously in their component property by changing the production parameter.

A second aspect of the invention comprises a computer program. The computer program can be loaded, for example, into a memory of an electronic computing device of a press and comprises programming to execute the steps of the method when the program is executed in an electronic computing device or control device connected to the press.

A third aspect of the invention relates to an electronically readable data carrier. The electronically readable data carrier comprises electronically readable items of control information stored thereon, which comprise at least one computer program as just presented or are designed such that they can carry out a method presented here upon the use of the data carrier in an electronic computing device.

Advantages of the method are to be viewed as advantages of the computer program and of the electronically readable data carrier and vice versa in each case.

Further features of the invention result from the claims, the figures, and the description of the figures. The features and combinations of features mentioned above in the description and the features and combinations of features mentioned hereinafter in the description of the figures and/or solely shown in the figures are usable not only in the respective specified combination, but also in other combinations or alone.

The invention will now be explained in more detail on the basis of a preferred exemplary embodiment and with reference to the drawings.

BRIEF DESCRIPTION OF THE DRAWING

FIG. 1 shows a schematic flow chart for a method for operating a press in which semifinished products are shaped into components.

DETAILED DESCRIPTION OF THE DRAWING

FIG. 1 shows a schematic flow chart of a method for operating a press, in which semifinished products, for example sheet metal plates, are shaped, in particular formed, into components, for example body components for motor vehicle construction. The press by which the method is operated can therefore in particular be a forming press but also, for example, a stamping press or the like.

It is a fact that not every component shaped using the press can be complexly measured in order to determine its accurate component properties or component quality. This would exceed the framework for time and/or costs, therefore in general only samples of the formed components are accurately measured. However, presently a selection of samples for the quality control is made randomly. Informative combinations of material properties of the semifinished product underlying the shaped component and production parameters or process parameters and the component quality resulting therefrom are thus not detected.

The method presented here is therefore based on the intention of compensating for the absence of desired data in order to, for example, improve a process control and thus an operation of the press.

Informative combinations of material properties of the semifinished product underlying the shaped component and production parameters or process parameters and the component quality resulting therefrom can be detected by the method. For this purpose, the presented method has several steps:

In a first step S1 of the method, at least one material property of the respective semifinished product is provided. The material property here is, for example, a thickness of the semifinished product, tensile strength, and/or further properties that characterize the semifinished product and are relevant for the shaping.

In a second step S2 of the method, at least one production parameter is detected, such as a setting of displacement cylinders which permit influencing of the contact pressure between a die, a blank, and the blank holder in the tool—in the forming tool. Furthermore, a drawing aid setting and/or a stroke number can be detected as the production parameter. In addition, for example, a process duration of the press could be detected. The production parameter characterizes a status of the press during the shaping of the respective semifinished product to form the respective component.

In a third step S3 of the method, at least one of the shaped components is selected from a set of the shaped components on the basis of the at least one material property of the in particular individual semifinished product underlying the selected component and/or on the basis of the at least one production parameter detected during the shaping of the at least one selected component or the production parameter used during shaping by an electronic computing device. The set corresponds in particular to the entirety of the set formed into the components from the provided semifinished products while the press is operated by the method.

In a fourth step S4 of the method, at least one component property is detected, in particular the component quality or the component grade, of the selected component by a measuring device. The measuring device is, for example, a separately provided measuring stand, in particular having sensors, in which the selected component, which represents a sample, can be measured more precisely or accurately than is possible, for example, by so-called in-line sensors during the shaping.

Subsequently, in a fifth step S5 of the method, a difference value is determined, which describes a deviation of the detected component property of the at least one selected component, thus the sample, from a target value predetermined for a component type of the component, thus the model of the component, for example a specific body component. In other words, it can be determined in particular in step S5 whether the component quality of the component selected as a sample meets the requirements for the general component quality.

Finally, in the sixth step S6 of the method, the difference value is provided, so that it can be used, for example, for a later change of the at least one production parameter.

Therefore, in particular in a further step of the method, for example, the at least one production parameter can be produced for subsequent shaping of a further component in dependence on the provided difference value.

In step S3, the selection is made in particular on the basis of the electronic computing device by machine learning, and therefore, for example, by a self-learning algorithm and/or by a neural network. Additionally or alternatively, statistical methods can furthermore be used for this purpose.

In particular, it is advantageous for a particularly advantageous operation of the press if a selection of the at least one component takes place on the basis of the at least one material property when these material properties deviate from a specified norm or a target property of the semifinished product. Thus, for example, a sheet thickness of a semifinished product can be greater than a specified sheet thickness. The component shaped from this semifinished product would therefore be a candidate for the selection by the electronic computing device. Influences of the semifinished product properties on the component quality can advantageously be determined by the selection of components, the underlying semifinished products of which deviate from the norm. Thus, for example, boundary conditions for the shaping by the press can furthermore be determined.

In addition, it is advantageous for the selection of the sample in step S3 if no component is selected during a starting process of the press. Additionally or furthermore, it is advantageous if the selection takes place with a stationary status of the press or with a stationary status of at least the at least one production parameter.

If several samples, thus at least two components, are selected instead of the at least one sample, it is advantageous if the material properties of the semifinished product underlying the respective selected component differ, so that the material property of the semifinished product of the first sample is different from the material property of the semifinished product of the second sample.

Additionally or alternatively, it can furthermore be advantageous upon the selection of several samples if at least one of the samples is randomly selected in addition to the samples selected by the algorithm of the electronic computing device.

Targeted, automated taking of samples for quality assurance based on the algorithm of the electronic computing device is thus implemented by the presented method. The quality or the material property of the semifinished products and the status of the production process in the form of the at least one production parameter are taken into consideration here. Both aspects, thus the at least one material property and the at least one production parameter, can take influence on the component quality in combination. This can be particularly advantageously determined and/or established by the method. It can thus be reasonable, for example, if semifinished products which are formed, for example, as particularly thick plates are checked with respect to their dimensional accuracy after the forming into the resulting components. A quality control based, for example, on the plate thickness is thus enabled by the selection of these components, by which a relationship can be determined between the plate thickness and the component property. The different thicknesses of the semifinished products are generally not based here on semifinished products having a greater thickness deliberately being used. These are undesired variations which can be within a specification interval.

It is to be noted here that such an analysis is first enabled when multiple such studies have been carried out, i.e., when the method is repeated multiple times or multiple components are selected from the set of deformed components. Advantageously, instead of the at least one material property, multiple material properties, for example a lubricant quantity and/or a roughness of the semifinished product, are observed in addition to the sheet thickness. In addition, the at least one production parameter and therefore the process conditions are additionally observed during the method. It can thus be ensured that a selection for the samples and thus a taking of samples only takes place, for example, if tools of the press or the press have reached a stationary status—in particular a temperature status. Furthermore, the taking or selection of the sample is not to take place immediately after a production interruption, since kinematics of the press can have changed during a restart in the first produced components, for example.

The advantageous algorithm for the method carried out by the electronic computing device can therefore find the optimum point in time for a selection of the at least one component and thus the samples during the production or the shaping of the components themselves and at the same time take into consideration that both semifinished products having standard values of the material properties and also having material properties deviating from the standard are fed to the quality check or the detection of the component property. In order to nonetheless also be able to determine unexpected effects, furthermore a random selection of the samples can additionally take place.

Targeted determination and collection of the difference values is thus enabled by the method, by which a process control can take place even without the use of a costly and time-intensive continuous detection of the quality of all produced components. In addition, quality criteria can also be taken into consideration which cannot advantageously be detected using currently available sensors—at least during the production.

The method or the steps for carrying out the method can be provided or made available as a computer program for the electronic computing device, in particular on an electronically readable data carrier.

An optimization of the sample taking for the quality assurance for implementing particularly advantageous operation of the press can be achieved by the method presented here.

LIST OF REFERENCE SIGNS

S1 first step
S2 second step

S3 third step
S4 fourth step
S5 fifth step
S6 sixth step

What is claimed is:

1. A method for operating a press, in which semifinished products are shaped into components, the method comprising:

providing at least one material property of at least one semifinished product; detecting at least one production parameter that characterizes a status of the press during shaping of the at least one semifinished product to form at least one respective shaped component;

selecting the at least one shaped component from a set of shaped components on a basis of the at least one material property of the at least one semifinished product underlying the at least one selected shaped component and/or on a basis of the at least one production parameter detected during the shaping of the at least one selected shaped component by way of an electronic computing device;

refraining from selecting a formed component that is shaped during a starting process of the press as the at least one selected shaped component;

detecting at least one component property of the at least one selected shaped component by way of a measuring device;

determining at least one difference value describing a deviation of the detected component property of the at least one selected shaped component from a target value predetermined for a component type of the at least one selected shaped component;

providing the at least one difference value;

setting the at least one production parameter to at least one updated production parameter in dependence on the at least one difference value; and automatically operating the press to subsequently shape a further shaped component using the at least one updated production parameter.

2. The method according to claim 1, comprising:

carrying out the selection of the at least one shaped component on a basis of the at least one material property in response to the at least one material property having a specified distance from an expected value of the at least one material property.

3. The method according to claim 1, comprising:

carrying out the selection of the at least one selected component by a self-learning algorithm and/or by at least one statistical method.

4. The method according to claim 1, comprising:

selecting the at least one shaped component during a stationary status of the press at least with respect to the at least one production parameter.

5. The method according claim 1, comprising:

selecting at least a first shaped component and a second shaped component as the at least one selected shaped component, wherein at least one material property of the first selected shaped component differs from at least one material property of the second selected shaped component.

6. The method according to claim 1, comprising:

selecting at least two shaped components as the at least one selected shaped component, wherein at least one of the at least two selected components is selected by a random method.

7. A non-transitory electronically readable storage medium having items of electronically readable control information stored thereon that, when executed by an electronic computing device, cause the electronic computing device to perform a method comprising:

providing at least one material property of at least one semifinished product; detecting at least one production parameter that characterizes a status of the press during shaping of the at least one semifinished product to form at least one respective shaped component;

selecting the at least one shaped component from a set of shaped components on a basis of the at least one material property of the at least one semifinished product underlying the at least one selected shaped component and/or on a basis of the at least one production parameter detected during the shaping of the at least one selected shaped component by way of an electronic computing device;

refraining from selecting a formed component that is shaped during a starting process of the press as the at least one selected shaped component;

detecting at least one component property of the at least one selected shaped component by way of a measuring device;

determining at least one difference value describing a deviation of the detected component property of the at least one selected shaped component from a target value predetermined for a component type of the at least one selected shaped component;

providing the at least one difference value;

setting the at least one production parameter to at least one updated production parameter in dependence on the at least one difference value; and automatically operating the press to subsequently shape a further shaped component using the at least one updated production parameter.

8. The non-transitory electronically readable storage medium according to claim 7, wherein the method comprises:

carrying out the selection of the at least one shaped component on a basis of the at least one material property in response to the at least one material property having a specified distance from an expected value of the at least one material property.

9. The non-transitory electronically readable storage medium according to claim 7, wherein the method comprises:

carrying out the selection of the at least one selected component by a self-learning algorithm and/or by at least one statistical method.

10. The non-transitory electronically readable storage medium according to claim 7, wherein the method comprises:

selecting the at least one shaped component during a stationary status of the press at least with respect to the at least one production parameter.

11. The non-transitory electronically readable storage medium according to claim 7, wherein the method comprises:

selecting at least a first shaped component and a second shaped component as the at least one selected shaped component, wherein at least one material property of the first selected shaped component differs from at least one material property of the second selected shaped component.

12. The non-transitory electronically readable storage medium according to claim 7, wherein the method comprises:

selecting at least two shaped components as the at least one selected shaped component, wherein at least one of the at least two selected components is selected by a random method.

* * * * *